United States Patent [19]

Larsen et al.

[11] 4,119,413

[45] Oct. 10, 1978

[54] METHOD FOR RECOVERING HYDROGEN BROMIDE GAS

[75] Inventors: Eric R. Larsen; Ernest L. Ecker, both of Midland, Mich.

[73] Assignee: The Dow Chemical Company, Midland, Mich.

[21] Appl. No.: 673,578

[22] Filed: Apr. 5, 1976

[51] Int. Cl.$^2$ ............................................ B01D 19/00
[52] U.S. Cl. ........................................ 55/71; 55/36
[58] Field of Search ............... 423/481, 488, 487, 240; 55/71, 84, 36

[56] References Cited

PUBLICATIONS

Kirk–Othmer "Encyclopedia of Chemical Tech." 2nd Ed., vol. 3, pp. 767–768.

Primary Examiner—Charles N. Hart
Assistant Examiner—E. Rollins Cross
Attorney, Agent, or Firm—J. M. Kuszaj

[57] ABSTRACT

This invention relates to a method for recovering hydrogen bromide gas from a gaseous stream. The method comprises contacting the gaseous stream with a nonaqeous hydrogen bromide absorbent containing acetic acid to absorb at least a portion of the hydrogen bromide. The hydrogen bromide containing absorbent is then heated to desorb at least a portion of the hydrogen bromide.

21 Claims, No Drawings

METHOD FOR RECOVERING HYDROGEN BROMIDE GAS

BACKGROUND OF THE INVENTION

This invention relates to the treatment of gaseous streams and more in particular to a method of recovering hydrogen bromide gas from a gaseous stream.

Commercially valuable hydrogen bromide gas streams often occur either as a result of the intentional synthesis of the gas or as a by-product gas arising from other chemical processes. These gaseous streams are usually contaminated by varying amounts of other gases such as hydrogen chloride, oxygen, nitrogen, bromine, carbon monoxide, carbon dioxide, methane, and/or inert gases. The presence of these contaminants results in large production and/or solvent losses in various products produced from the hydrogen bromide.

One common method of removing hydrogen bromide gas from a contaminated stream is by liquefication of the gaseous stream. The hydrogen bromide can subsequently be stored and shipped as a liquid under pressure. Removal of undesired gases, with the exception of hydrogen chloride, bromine, and carbon dioxide occurs during the liquefication process.

However, the liquefication process is costly and has a number of disadvantages, mainly high pressure and corrosiveness of the hydrogen bromide. Therefore, it is desirable that a new process be developed for the purification and recovery of hydrogen bromide gas from gaseous streams.

SUMMARY OF THE INVENTION

A method for recovering hydrogen bromide gas from a gaseous stream has been developed. The method comprises contacting the gaseous stream with a nonaqueous hydrogen bromide absorbent containing acetic acid to absorb at least a portion of the hydrogen bromide. The hydrogen bromide containing absorbent is heated to desorb at least a portion of the hydrogen bromide.

DESCRIPTION OF A PREFERRED EMBODIMENT

The gaseous streams treated by the present method generally contains hydrogen bromide gas contaminated with gaseous impurities including at least one member selected from the group consisting of hydrogen chloride, oxygen, hydrogen, nitrogen, bromine, carbon monoxide, carbon dioxide, methane, helium, neon, argon, krypton, and the like. More typically, the gaseous streams treated consist essentially of anhydrous hydrogen bromide, hydrogen, and bromine; or anhydrous hydrogen bromide and hydrogen chloride, or anhydrous hydrogen bromide, carbon monoxide, and bromine.

The gaseous stream is preferably contacted with a nonaqueous hydrogen bromide absorbent by any suitable gas-liquid contacting means, such as by passing the gaseous stream into the nonaqueous hydrogen bromide absorbent in a batch type process, or by contacting the gaseous stream with a cocurrent or countercurrent falling film of the absorbent. A single-pass falling absorbing apparatus has been found to give satisfactory results.

The hydrogen bromide absorbent contains acetic acid. Preferably, the hydrogen bromide absorbent contains acetic acid and at least one member selected from the group consisting of an acid anhydride, and an acid halide. Acetic anhydride is the preferred acid anhydride since it is capable of reacting with any water present to form acetic acid. However, other acid anhydrides such as propionic anhydride, benzoic anhydride, and the like may be used. Suitable acid halides can include acetyl bromide, proprionyl bromide, chloroactyl chloride, and the like.

Preferably, the hydrogen bromide absorbent contains a mixture of from about 80 to about 100 percent by weight acetic acid and from about 0 to 20 percent by weight of at least one member selected from the group consisting of an acid anhydride, and an acid halide. A hydrogen bromide absorbent containing a mixture of about 90 percent by weight acetic acid and about 10 percent by weight of one member selected from the group consisting of an acid anhydride, and an acid halide is more preferred. The absorbent may also contain impurities normally found in commercial glacial acetic acid or acid anhydride, or acid halide.

The contacting of the gaseous stream with the absorbent preferably occurs at a hydrogen bromide partial pressure of from about 0.5 to about 200 pounds per square inch absolute (psia) when the absorbent is preferably maintained at a temperature of from about $-15°$ to about $100°$ C.

More preferably contacting occurs at a hydrogen bromide partial pressure of from about 3 to about 100 psia when the absorbent is maintained at a temperature of from about $0°$ to about $75°$ C.

Most preferably the contacting is carried out at atmospheric pressure when the temperature of the absorbent solution is from about $0°$ C. to about $20°$ C. At the preferred temperatures and pressures, at least a portion of the hydrogen bromide is absorbed by the absorbent. Other pressures and temperatures within the preferred operating range can be used in the present process. However, the amount of hydrogen bromide gas that can be absorbed is dependent upon the vapor pressure and temperature of the hydrogen bromide-acetic acid system.

Preferably the contacting occurs for a sufficient time to allow absorption of at least a portion and more preferably substantially all of the absorbable hydrogen bromide.

After at least a portion of the hydrogen bromide has been absorbed, the hydrogen bromide containing absorbent is heated in a suitable container to desorb at least a portion of the hydrogen bromide. The solution is preferably heated to a temperature sufficient to desorb at least a portion, and more preferably substantially all of the recoverable hydrogen bromide. The hydrogen bromide containing absorbent is generally heated to about the boiling temperature of the absorbent. For example, when the absorbent contains acetic acid, the hydrogen bromide containing absorbent is heated to about $118°$ C.

It has been found that the use of acetic acid as the absorption medium in the present process has several distinct advantages over other solvent. Among the advantages is the fact that since hydrogen bromide does not form an azeotrope with acetic acid, there is no azeotropic limit to the amount of hydrogen bromide that can be absorbed in the acetic acid. Another advantage is that acetic acid, bromine, and a portion of the hydrogen bromide form a stable non-volatile complex which does not separate with hydrogen bromide during desorption. A further advantage of the present process is that if the hydrogen bromide is not desorbed, it may be stored in the acetic acid at ambient temperature and pressure without resort to conventional liquefication techniques.

The following examples are illustrative of the present invention.

EXAMPLE 1

A glass absorption column including an inner and outer column was used for contacting the gaseous stream. The inner column had a 2 inch outside diameter and was 30 inches long. It was mounted inside a 3 inch outside diameter outer glass column 36 inches long so as to define an annular space between columns. The inner column was cooled internally to about 13° C. by continuously passing tap water through the column.

The hydrogen bromide absorbent containing a mixture of 90 percent by weight acetic acid and 10 percent by weight acetic anhydride was pumped at 25° C. into the top of the annular space between the outer and inner columns through an inlet tube at a rate of 15.4 grams per minute. (g/min) The absorbent was cooled to about 13° C. by contact with the inner column and established a falling film on the outside surface of the inner column.

A gaseous mixture of 90 percent by volume anhydrous hydrogen bromide (less than 0.1 percent $H_2O$ by volume) and 10 percent by volume nitrogen at 25° C., one atmosphere pressure, was passed upward through the annular space between the inner and outer columns. The rate of the hydrogen bromide flow was 16 grams of hydrogen bromide per minute.

When the column reached equilibrium, a 5-minute run was made. During this period 77 grams of the absorbent was passed through the column countercurrent to 72 grams of gaseous anhydrous hydrogen bromide. 143 Grams of liquid column effluent was collected and heated to 118° C. in a distillation apparatus until at least 92 percent of the absorbed hydrogen bromide evolved and was collected by normal distillation techniques. 66 Grams of hydrogen bromide was separated along with 77 Grams of the solution of acetic acid and acetic anhydride. The nitrogen gas and 6 Grams of unabsorbed hydrogen bromide gas passed through the top of the absorption column and were collected over water in a tail gas scrubber.

92 Percent of the gaseous hydrogen bromide contained in the initial gaseous mixture was recovered by distillation of the hydrogen bromide containing absorbent.

EXAMPLE 2

A column constructed and operated substantially as described in Example 1 was used to separate a gaseous stream containing anhydrous hydrogen bromide and hydrogen chloride at a molar ratio of 2.5/1. The absorbent, containing 90 percent by weight acetic acid and 10 percent by weight acetic anhydride, was pumped into the top of the annular space between the inner and outer columns at a rate of 24 g/min. The gaseous stream at 25° C. and one atmosphere pressure was passed upward through the annular space between the inner and outer columns at a rate of 13.6 g/min. This rate was sufficient to carry excess hydrogen bromide into the tail gas scrubber.

A 5-minute run was made after the system had equilibrated. During this period 100 grams of anhydrous hydrogen bromide and 18 grams of hydrogen chloride (molar ratio 2.5/1) were passed into the column. The hydrogen bromide and hydrogen chloride concentrations in the tail gas scrubber and in the column effluent were determined by titration of the $Br^-$ and $Cl^-$ ions.

The tail gas scrubber was found to contain 34.7 grams of hydrogen bromide and 13.5 grams of hydrogen chloride, or a hydrogen bromide to hydrogen chloride molar ratio of 1.15/1.

The absorbed hydrogen bromide was separated from the liquid column effluent and collected substantially as disclosed in Example 1.

The liquid column effluent contained 68.0 grams of hydrogen bromide and 2.74 grams of hydrogen chloride, or a hydrogen bromide to hydrogen chloride molar ratio of 11.2/1.

68 Percent of the gaseous hydrogen bromide contained in the initial gaseous mixture was recovered by distillation of the hydrogen bromide containing absorbent.

EXAMPLE 3

In substantially the same manner as described in Example 2, a gaseous mixture of anhydrous hydrogen bromide and hydrogen chloride having a hydrogen bromide to hydrogen chloride molar ratio of 1.12/1 (100 g hydrogen bromide and 38.2 g hydrogen chloride) was introduced into the column. Titration of the tail gas scrubber showed a hydrogen bromide to hydrogen chloride molar ratio of 0.9/1. The hydrogen bromide was separated from the liquid column effluent and collected substantially as disclosed in Example 1. The liquid column effluent showed a hydrogen bromide to hydrogen chloride molar ratio of 6.10/1.

What is claimed is:

1. A method for recovering hydrogen bromide gas from a gaseous stream comprising the steps of:
   (a) contacting the gaseous stream with a nonaqueous hydrogen bromide absorbent containing acetic acid to absorb at least a portion of the hydrogen bromide;
   (b) heating the hydrogen bromide containing absorbent to desorb at least a portion of the hydrogen bromide.

2. The method of claim 1 wherein the contacting comprises passing the gaseous stream countercurrently to a falling film of the nonaqueous hydrogen bromide absorbent.

3. The method of claim 1 wherein the contacting comprises passing the gaseous stream cocurrently to a falling film of the nonaqeous hydrogen bromide absorbent.

4. The method of claim 1 wherein the contacting comprises passing the gaseous stream into the nonaqueous hydrogen bromide absorbent.

5. The method of claim 1 including contacting the gaseous stream with a nonaqueous hydrogen bromide absorbent maintained at a temperature of from about −15° to about 100° C.

6. The method of claim 5 wherein the contacting occurs at a hydrogen bromide partial pressure of from about 0.5 to about 200 pounds per square inch absolute.

7. The method of claim 1 including contacting the gaseous stream with a nonaqueous hydrogen bromide absorbent mantained at a temperature of from about 0° to about 75° C.

8. The method of claim 7 wherein the contacting occurs at a hydrogen bromide partial pressure of from about 3 to about 100 pounds per square inch absolute.

9. The method of claim 1 including contacting the gaseous stream with a nonaqueous hydrogen bromide absorbent maintained at a temperature of from about 0° to about 20° C.

10. The method of claim 9 wherein the contacting occurs at atmospheric pressure.

11. The method of claim 1 wherein the contacting occurs for a sufficient time to absorb at least a portion of the hydrogen bromide.

12. The method of claim 1 wherein the heating occurs at a temperature sufficient to desorb at least a portion of the hydrogen bromide.

13. A method for recovering hydrogen bromide gas from a gaseous stream comprising the steps of:
 (a) contacting the gaseous stream with a nonaqueous hydrogen bromide absorbent containing acetic acid and at least one member selected from the group consisting of an acid anhydride and an acid halide to absorb at least a portion of the hydrogen bromide;
 (b) heating the hydrogen bromide containing absorbent to desorb at least a portion of the hydrogen bromide.

14. The method of claim 13 wherein the nonaqueous hydrogen bromide absorbent contains a mixture of from about 80 to about 100 percent by weight acetic acid and from about 0 to about 20 percent by weight of at least one member selected from the group consisting of an acid anhydride and an acid halide.

15. The method of claim 13 wherein the nonaqueous hydrogen bromide absorbent contains a mixture of about 90 percent by weight acetic acid and about 10 percent by weight of at least one member selected from the group consisting of an acid anhydride and an acid halide.

16. The method of claim 13 wherein the acid anhydride is acetic anhydride.

17. A method of recovering hydrogen bromide gas from a gaseous stream containing hydrogen bromide and at least one member selected from the group consisting of hydrogen chloride, oxygen, hydrogen, nitrogen, bromine, carbon monoxide, carbon dioxide, methane, helium, neon, argon, and krypton comprising the steps of:
 (a) passing the gaseous stream through a falling film of a nonaqueous hydrogen bromide absorbent containing acetic acid and acetic anhydride to absorb at least a portion of the hydrogen bromide;
 (b) heating the hydrogen bromide containing absorbent to desorb at least a portion of the hydrogen bromide.

18. The method of claim 17 wherein the gaseous stream consists essentially of anhydrous hydrogen bromide, hydrogen, and bromine.

19. The method of claim 17 wherein the gaseous stream consists essentially of anhydrous hydrogen bromide and hydrogen chloride.

20. The method of claim 17 wherein the gaseous stream consists essentially of anhydrous hydrogen bromide, carbon monoxide, and bromine.

21. The method of claim 17 wherein the nonaqueous hydrogen bromide absorbent contains about 90 percent by weight acetic acid and about 10 percent by weight acetic anhydride.

* * * * *

UNITED STATES PATENT AND TRADEMARK OFFICE
CERTIFICATE OF CORRECTION

PATENT NO. : 4,119,413

DATED : October 10, 1978

INVENTOR(S) : Eric R. Larsen et al.

It is certified that error appears in the above-identified patent and that said Letters Patent are hereby corrected as shown below:

In the abstract, Column 2, line 3, delete "nonaqe" and insert therefor --nonaque--.

In Column 1, line 62, add --film-- in front of absorbing.

In Column 4, line 46, delete "nonaqeous" and insert therefor --nonaqueous--.

Signed and Sealed this

Third Day of April 1979

[SEAL]

Attest:

RUTH C. MASON
Attesting Officer

DONALD W. BANNER
Commissioner of Patents and Trademarks